United States Patent
Balasubramanian et al.

(10) Patent No.: US 8,295,184 B2
(45) Date of Patent: Oct. 23, 2012

(54) WIRELESS CONNECTION CONTROL

(75) Inventors: Sanjeevi Balasubramanian, Santa Clara, CA (US); Ricardo R. Velasco, San Jose, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 12/752,934

(22) Filed: Apr. 1, 2010

(65) Prior Publication Data
US 2011/0242986 A1    Oct. 6, 2011

(51) Int. Cl.
H04L 12/26    (2006.01)
H04W 52/16    (2009.01)

(52) U.S. Cl. ........ 370/242; 370/252; 370/328; 370/332; 455/522

(58) Field of Classification Search ............ 370/242, 370/252, 236, 328, 338, 331, 332–333; 455/436, 455/437–439, 522
See application file for complete search history.

(56) References Cited

U.S. PATENT DOCUMENTS

| | | | | |
|---|---|---|---|---|
| 7,079,856 B2 * | 7/2006 | Khan | ........................ | 455/517 |
| 7,672,276 B2 * | 3/2010 | Ode et al. | ..................... | 370/332 |
| 7,835,287 B2 * | 11/2010 | Hosomi | ........................ | 370/241 |
| 7,844,265 B2 * | 11/2010 | Kuchibhotla et al. | ......... | 455/423 |
| 7,990,910 B2 * | 8/2011 | Watanabe | ..................... | 370/324 |
| 8,036,665 B2 * | 10/2011 | Shah | ............................ | 455/438 |
| 2008/0081655 A1 * | 4/2008 | Shin et al. | ..................... | 455/522 |
| 2008/0268766 A1 | 10/2008 | Narkmon et al. | | |
| 2009/0201871 A1 * | 8/2009 | Sambhwani et al. | ......... | 370/329 |
| 2009/0296864 A1 * | 12/2009 | Lindoff et al. | ................ | 375/357 |
| 2010/0054191 A1 * | 3/2010 | Higuchi et al. | ................ | 370/329 |
| 2010/0087197 A1 * | 4/2010 | Iwamura et al. | .............. | 455/436 |
| 2010/0322188 A1 * | 12/2010 | Nagatake et al. | ............. | 370/331 |

FOREIGN PATENT DOCUMENTS

| | | |
|---|---|---|
| EP | 1 047 275 | 4/1999 |
| WO | WO 2009/051534 | 4/2009 |

* cited by examiner

*Primary Examiner* — Kwang B Yao
*Assistant Examiner* — Candal Elpenord
(74) *Attorney, Agent, or Firm* — Gazdzinski & Associates, PC

(57) ABSTRACT

Controlling a wireless connection of a mobile wireless communication device to a wireless communication network. When the mobile wireless communication device is connected to a base transceiver station through a radio frequency link, the mobile wireless communication device detects a signal quality of the radio frequency link. If the detected signal quality is at or below a first threshold and decreasing over a first detection time interval, then the mobile wireless communication device estimates a maximum response time interval until the detected signal quality of the radio frequency link is below a second threshold. The mobile wireless communication device delays transmitting only those control messages that cause the wireless communication network to respond to subsequent control messages beyond the estimated maximum response time interval.

24 Claims, 7 Drawing Sheets

WIRELESS CONNECTION CONTROL

TECHNICAL FIELD

The described embodiments relate generally to wireless mobile communications. More particularly, a method is described for controlling a wireless connection of a mobile wireless communication device to base transceiver stations in a wireless communication network.

BACKGROUND OF THE INVENTION

Mobile wireless communication devices, such as a wireless cellular telephone or a wireless enabled computer tablet, can provide a wide variety of communication services including, for example, voice communication, text messaging, internet browsing, and audio/video streaming. Continuous access to services while the mobile wireless communication device moves across a geographic region served by multiple cells of a wireless communication network can require a seamless handoff between different cells in the network. Wireless communication networks can use different standardized communication protocols, such as the Global System for Mobile Communications (GSM) and the Universal Mobile Telecommunication System (UMTS). Each of these standardized communication protocols can specify access techniques that permit the simultaneous service of multiple mobile wireless communication devices by a wireless communication network.

As individual cells within a wireless communication network can overlap in the geographic regions that they serve, a mobile wireless communication device can simultaneously transmit to and receive from several different base transceiver stations located in different cells. The mobile wireless communication device can indicate to the wireless communication network the quality of signals that the mobile wireless communication network detects from the different base transceiver stations, as the mobile wireless communication device traverses the wireless communication network. The wireless communication network can add and delete radio frequency links between the mobile wireless communication device and the different base transceiver stations to maintain a continuous wireless connection.

The wireless communication network can receive control messages (including those that indicate received signal quality from various base transceiver stations) at regular intervals from the mobile wireless communication device. If the wireless communication network processes control messages from the mobile wireless communication device in the order received, then some control messages, such as those indicating newly detected base transceiver stations, can be delayed for processing by the wireless communication network until earlier received control messages have been processed. When the mobile wireless communication device travels from one cell to another cell in the wireless communication network, with an attendant rapid decrease in signal quality from the first cell and a simultaneous rapid increase in signal quality from the second cell, adding a connection to the second cell can require rapid processing by the wireless communication network to maintain the wireless connection with the mobile wireless communication device. Delaying the addition of the second cell can result in the wireless connection being terminated. Thus there exists a need for controlling a wireless connection between a mobile wireless communication device and a wireless communication network when signal quality of the current serving cell degrades rapidly in order to maintain the integrity of the wireless connection.

SUMMARY OF THE DESCRIBED EMBODIMENTS

This paper describes various embodiments that relate to methods to control a wireless connection of a mobile wireless communication device to base transceiver stations located in different cells of a wireless communication network. A method to maintain the wireless connection when radio frequency links to base transceiver stations are changing is described.

In one embodiment a method of controlling a wireless connection of a mobile wireless communication device to a wireless communication network is described. The method includes at least the following steps when the mobile wireless communication device is connected to a first base transceiver station through a first radio frequency link. The mobile wireless communication device detects a signal quality of the first radio frequency link. If the detected signal quality is at or below a first threshold and decreasing over a first detection time interval, then the mobile wireless communication device estimates a maximum response time interval until the detected signal quality of the first radio frequency link is below a second threshold. The mobile wireless communication device delays transmitting those control messages that cause the wireless communication network to respond to subsequent control messages beyond the estimated maximum response time interval. In some embodiments, the method further includes transmitting a detection control message before transmitting the delayed control messages from the mobile wireless communication device to the wireless communication network. The detection control message indicates receiving a signal at the mobile wireless communication device from a second base transceiver station having a second signal quality above a third threshold and increasing for a second detection interval.

In another embodiment, a mobile wireless communication device includes a first transceiver that receives signals through a first wireless connection to a wireless communication network and a control processor coupled to the first transceiver. The control processor controls the wireless connection of the mobile wireless communication device to the wireless communication network by at least the following steps. When the mobile wireless communication device is connected to a first base transceiver station through a first radio frequency link, the mobile wireless communication device detects a signal quality of the first radio frequency link. If the detected signal quality is at or below a first threshold and decreasing over a first detection time interval, then the mobile wireless communication device estimates a maximum response time interval until the detected signal quality of the first radio frequency link is below a second threshold. The mobile wireless communication device delays transmitting only those control messages that cause the wireless communication network to respond to subsequent control messages beyond the estimated maximum response time interval. In some embodiments, the control processor further controls the wireless connection by transmitting a detection control message before transmitting the delayed control messages from the mobile wireless communication device to the wireless communication network. The detection control message indicates receiving a signal at the mobile wireless communication device from a second base transceiver station having a second signal quality above a third threshold and increasing for a second detection interval.

In yet another embodiment, a computer readable medium for tangibly storing computer program code executable by a processor for controlling a wireless connection in a mobile wireless communication device is disclosed. When the wireless mobile communication device is connected to a first base transceiver station through a first radio frequency link, the computer program code detects a signal quality of the first radio frequency link. If the detected signal quality is at or below a first threshold and decreasing over a first detection time interval, then the computer program code estimates a maximum response time interval until the detected signal quality of the first radio frequency link is below a second threshold. The computer program code delays transmission of control messages from the mobile wireless communication device for a delay interval. Only those control messages that cause the wireless communication network to respond to subsequent control messages beyond the estimated maximum response time interval are delayed.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
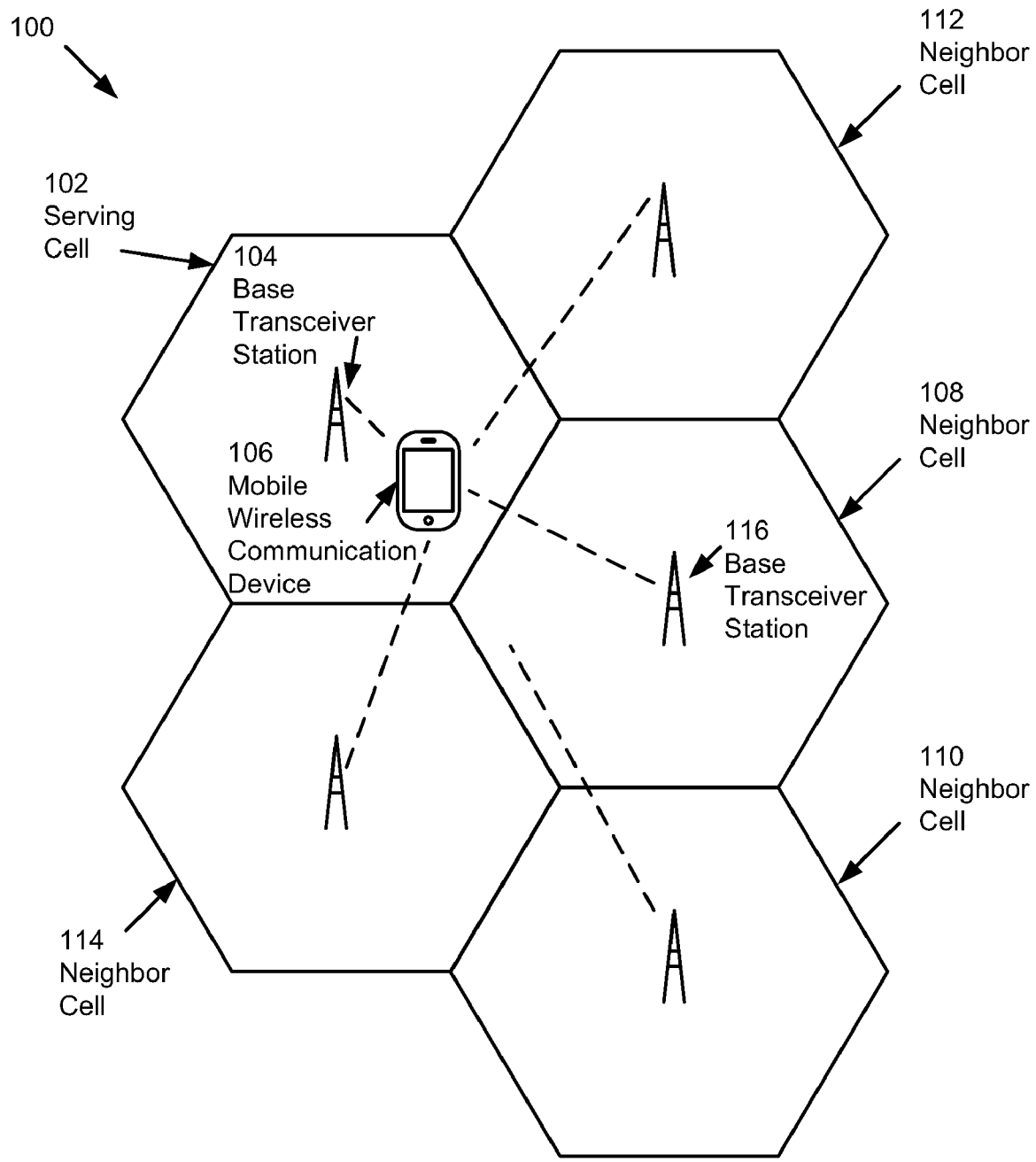
FIG. 1 illustrates a mobile wireless communication device connected to base transceiver stations in a wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Continuous access to communication services while a mobile wireless communication device moves across a geographic region served by multiple cells of a wireless communication network can require a seamless handoff between different cells. Cells within a wireless communication network can overlap, and a mobile wireless communication device can simultaneously transmit to and receive from different base transceiver stations located in different cells. The mobile wireless communication device can send control messages to the wireless communication network, and some control messages can include a measure of signal quality that the mobile wireless communication network receives from different base transceiver stations as the mobile wireless communication device traverses the wireless communication network. Representative measures of signal quality can include a received signal code power (RSCP) and an energy per chip to total noise ($E_cN_o$) from base transceiver stations. The wireless communication network can add a radio frequency link between the mobile wireless communication device and a second base transceiver station to provide a "soft handoff" before terminating a radio frequency link with a first base transceiver station. A successful soft handoff can help maintain a communication link as one radio frequency link deteriorates in signal quality and a second radio frequency link improves in signal quality.

The mobile wireless communication device can regularly send to the wireless communication network control messages of different types. In some wireless communication networks, the control messages received from the mobile wireless communication device can be processed in the order received, e.g. in a "first in, first out" (FIFO) manner. Some control messages can require extensive processing by the wireless communication network, such that subsequent control messages can be delayed while earlier received control messages are processed. If a signal quality of a first radio frequency link with a base transceiver station in a first cell rapidly decreases, then adding a second radio frequency link to a base transceiver station in a second cell can require quick processing by the wireless communication network to maintain wireless connection with the mobile wireless communication device. When detecting a deteriorating signal quality of the first radio frequency link, the mobile wireless communication device can estimate a time interval beyond which control messages from the wireless network cannot be reliably received by the mobile wireless communication device. Control messages from the mobile wireless communication device that cause the wireless communication network to respond beyond the estimated time interval can be delayed. By delaying sending these control messages, other control messages from the mobile wireless communication device, such as those that indicate to the wireless communication network an increasing signal quality received from another base transceiver station, can be processed by the wireless communication network. A second radio frequency link to another base transceiver station can be established before the first radio frequency link can deteriorate too much causing the wireless connection to terminate.

FIG. 1 illustrates a mobile wireless communication device 106 located in a serving cell 102 of a wireless communication network 100 and connected by a radio frequency link to a base transceiver station 104. The mobile wireless communication device can also receive radio frequency signals from base transceiver stations located in neighboring cells 108/112/114. Radio frequency signals transmitted by a base transceiver station located in a more distant neighbor cell 110 can be attenuated sufficiently that the mobile wireless communication device 106 can be unaware of the neighbor cell 110. The mobile wireless communication device 106 can regularly send control messages through the radio frequency link to the base transceiver station 104, which can then be processed by a network control center (not shown) of the wireless communication network. The control messages can include measured values of signal quality received by the mobile wireless communication device 106 from several different base transceiver stations, each base transceiver station located in different cells of the wireless communication network 100. As the mobile wireless communication device 106 moves about the geographic region covered by the wireless communication network 100, the signal quality received from different base transceiver stations can vary significantly. The network control center of the wireless communication network 100 can add or delete radio frequency links between the mobile wireless communication device 106 and the base transceiver stations at least partially based on the signal quality information provided by the control messages sent from the mobile wireless communication device 106.

Some wireless communication protocols can include a feature known as a "soft handoff", in which the mobile wireless communication device 106 can be simultaneously linked to base transceiver stations in more than one cell of the wireless communication network 100. The mobile wireless communication device 106 can combine signals received from the multiple base transceiver stations to which it is linked and more reliably decode the combined signal than from a single base transceiver station alone. Signals received from each of the multiple base transceiver stations can vary as mobile wireless communication device 106 transverses the wireless communication network 100, and the "soft handoff" feature can help maintain the wireless connection between the mobile wireless communication device 106 and the wireless communication network 100.

Figure 2:
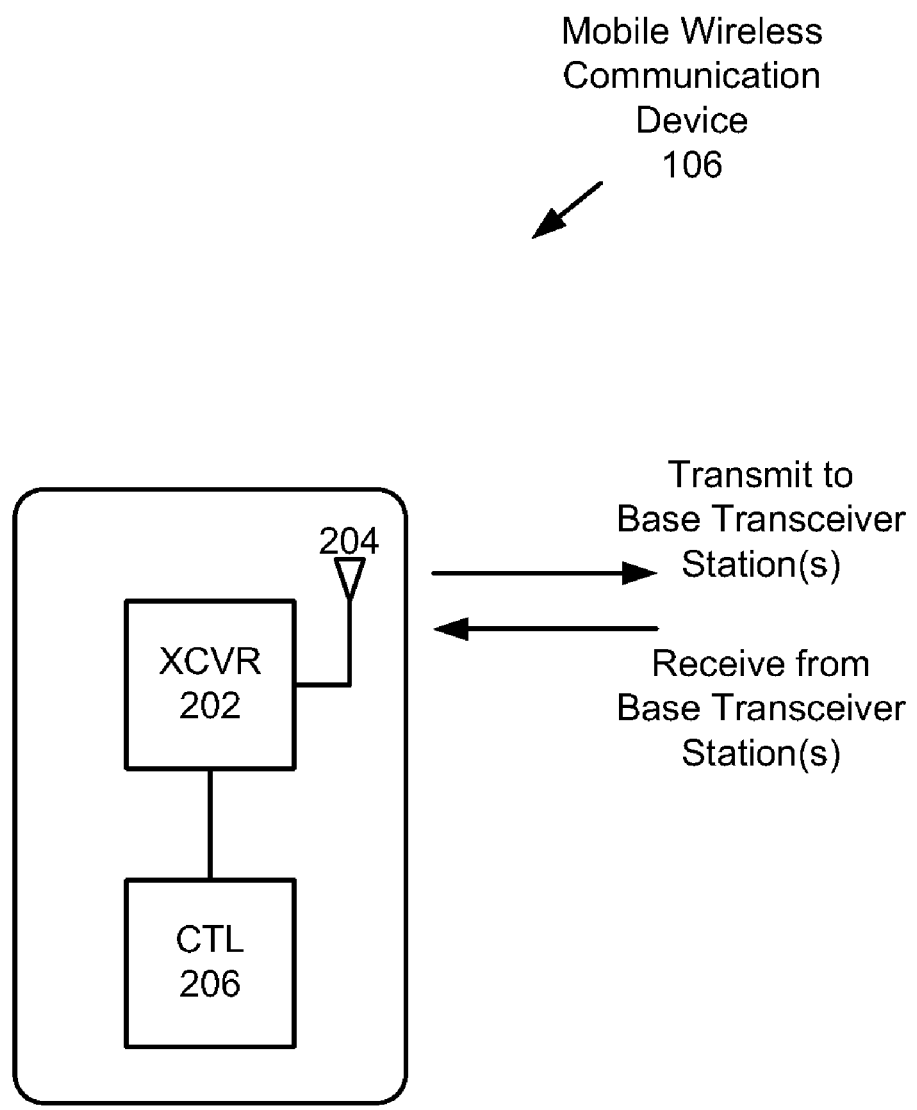
FIG. 2 illustrates elements of a mobile wireless communication device.

FIG. 2 illustrates a representative embodiment of the mobile wireless communication device 106, including a transceiver (XCVR) 202 that can transmit and receive radio frequency signals to and from base transceiver stations in the wireless communication network 100 through an antenna 204. In some embodiments, multiple antennas can be included in the mobile wireless communication device 106 to increase transmit and/or receive signal diversity. The transceiver 202 can encode and modulate digital data into analog signals for transmission on a radio frequency carrier through the antenna 204. Similarly the transceiver 202 can demodulate and decode analog signals received by the antenna 204. A controller 206 can formulate digital data messages that can be transmitted and received by the transceiver 202. The controller 206, for example, can monitor signals received from multiple base transceiver stations in the wireless communication network 100 and can generate control messages to be sent over the uplink direction of the radio frequency link between the mobile wireless communication device 106 and the wireless communication network 100.

Figure 3:
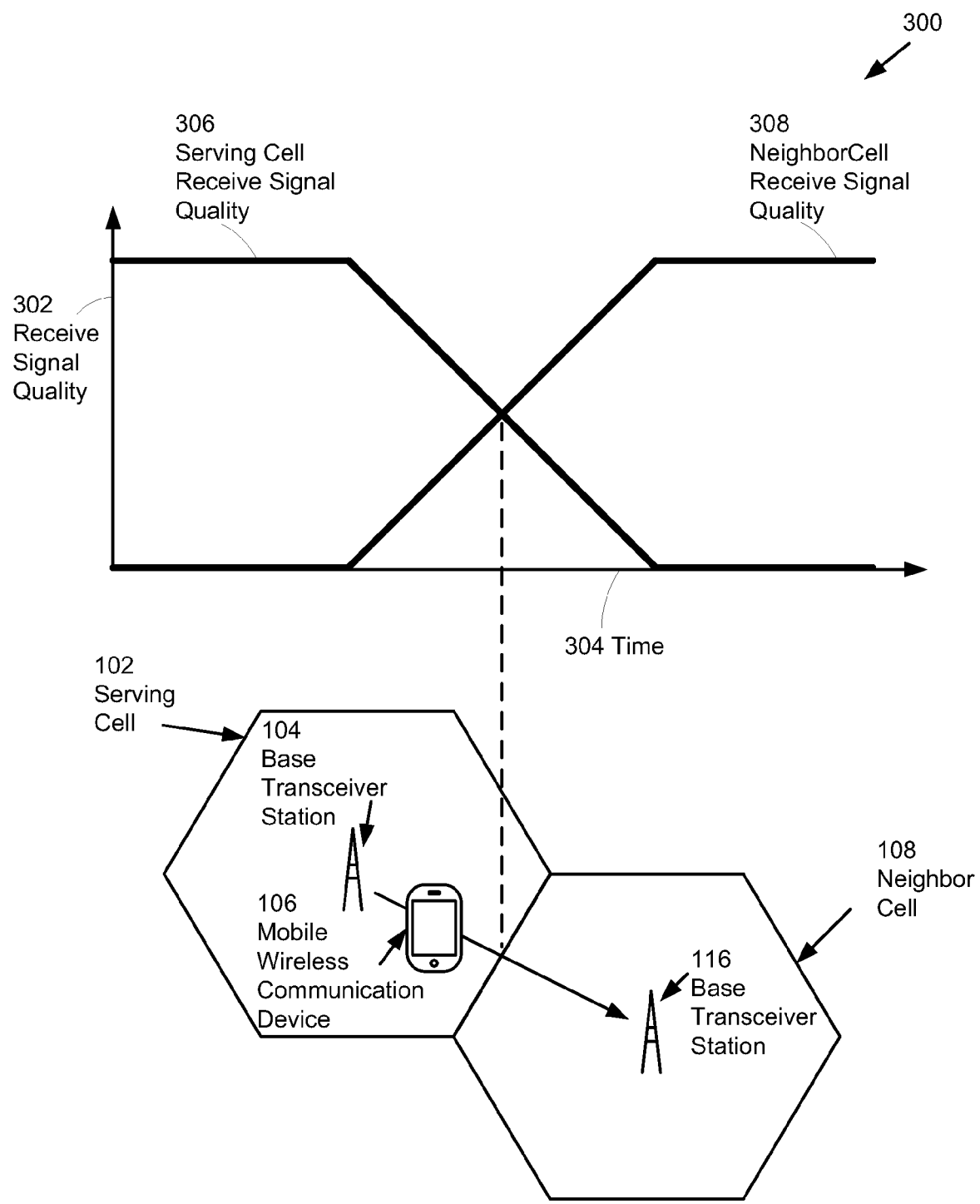
FIG. 3 illustrates changes in receive signal quality as a mobile communication device moves between cells in a wireless communication network.

FIG. 3 illustrates that received signal quality 302, as measured at the mobile wireless communication device 106 when it moves from the serving cell 102 to the neighbor cell 108, can vary. When the mobile wireless communication device 106 is closer to the base transceiver station 104 located in the serving cell 102, the signal quality 306 of the serving cell's base transceiver station 104 received at the mobile wireless communication device 106 can be high. As the mobile wireless communication device 106 moves away from the base transceiver station 104, the serving cell receive signal quality 306 can deteriorate. Simultaneously the mobile wireless communication device 106 can move closer to the base transceiver station 116 located in the neighbor cell 108, and the neighbor cell receive signal quality 308 can improve. A successful, seamless soft handoff between the initial serving cell 102 and the neighbor cell 108 (that can become a subsequent serving cell) can maintain the wireless connection of the mobile wireless communication device 106 with the wireless communication network 100.

Figure 4:
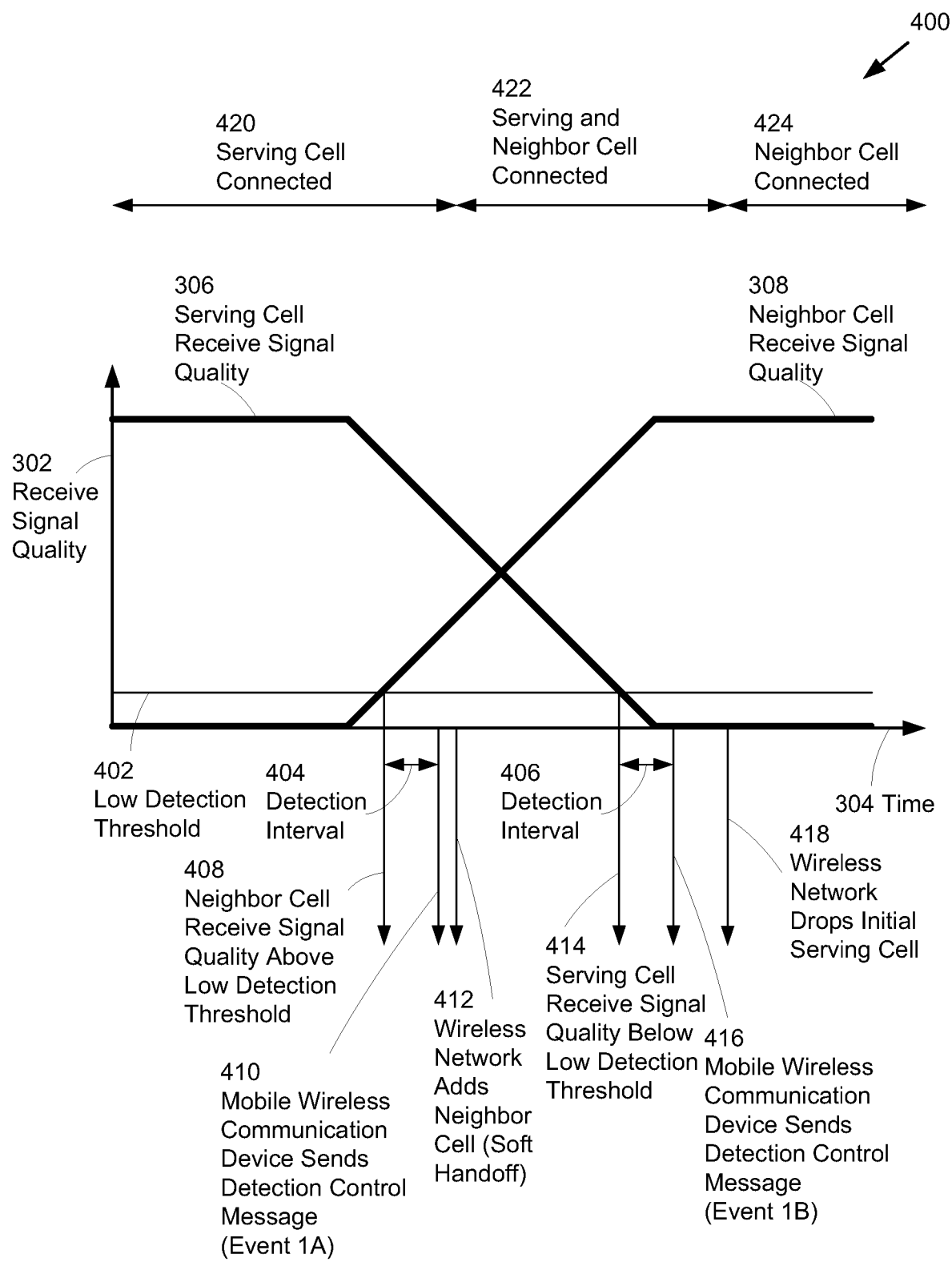
FIG. 4 illustrates a successful soft handoff of a mobile wireless communication device between two cells in a wireless communication network.

FIG. 4 illustrates a series of events that can occur during a successful soft handoff of the mobile wireless communication device 106 between a serving cell and a neighbor cell. Initially the mobile wireless communication device 106 can be connected to the serving cell during a first time interval 420. The mobile wireless communication device 106 can compare the quality of signals received from both the serving cell and any neighbor cells against a low signal quality detection threshold 402. The neighbor cell's receive signal quality 308 can rise above the low detection threshold 402 (event 408), and the mobile wireless communication device 106 can send a control message (event 410) to the wireless communication network 100 indicating the detected increased signal quality of the neighbor cell. A representative detection control message (event 410) can be an "event 1A" message as used in a UMTS wireless communication network that indicates that a common pilot channel (CPICH) received signal code power (RSCP) or a CPICH energy per chip to total noise (EcNo) from a base transceiver station exceeds a threshold sufficient for connecting the mobile wireless communication device 106 to the base transceiver station. In the 3GPP mobile wireless specification, an "event 1A" can occur whan a primary CPICH enters a reporting range. The detection control message can be sent after waiting for an appropriate detection interval 404 set by the wireless communication network. The wireless communication network 100 can respond to the detection control message (event 410) by sending a message to the mobile wireless communication device 106 that adds the detected neighbor cell (event 412) to the wireless connection with the mobile wireless communication device 106. This process of adding a second cell before deleting a first cell can be known as a "soft handoff." Both the serving cell and the neighbor cell can be simultaneously connected to the mobile wireless communication device 106 during a second time interval 422.

As the serving cell receive signal quality 306 can deteriorate over time as the mobile wireless communication device 106 moves further from the base transceiver station in the serving cell, eventually the serving cell receive signal quality 306 can fall below the low detection threshold 402 (event 414). (In some embodiments, different levels for low detection thresholds can be used for measuring "increasing" signal quality when locating unconnected neighbor cells, and for measuring "decreasing" signal quality of connected cells. FIG. 4 illustrates a single low detection threshold 402 for both conditions to simplify the drawing, but no limitation is implied.) After a second detection interval 406, the mobile wireless communication device 106 can send a second detection control message (event 416) to the wireless communication network 100 indicating the detected decreased serving cell signal quality 306. A representative detection control message (event 416) can be an "event 1B" message as used in a UMTS wireless communication network. The wireless communication network 100 can terminate the radio frequency link with the initial serving cell (event 418) in response to the second detection control message. Subsequently the mobile wireless communication device 106 can be connected to the neighbor cell only over a time interval 424. The detection control messages sent by the mobile wireless communication device 106 and the responses from the wireless communication network 100 can result in a soft handoff as the signal quality of cells received by the mobile wireless communication device 106 changes. Initially the mobile wireless communication device 106 can be connected solely to the serving cell. Then the mobile wireless communication device 106 can be simultaneously connected to both the serving cell and the neighbor cell. Finally the mobile wireless communication device 106 can be connected only to the neighbor cell. The "soft handoff" maintains a continuous connection of the mobile wireless communication device 106 to the wireless communication network 100, with a seamless transition between cells.

Figure 5:
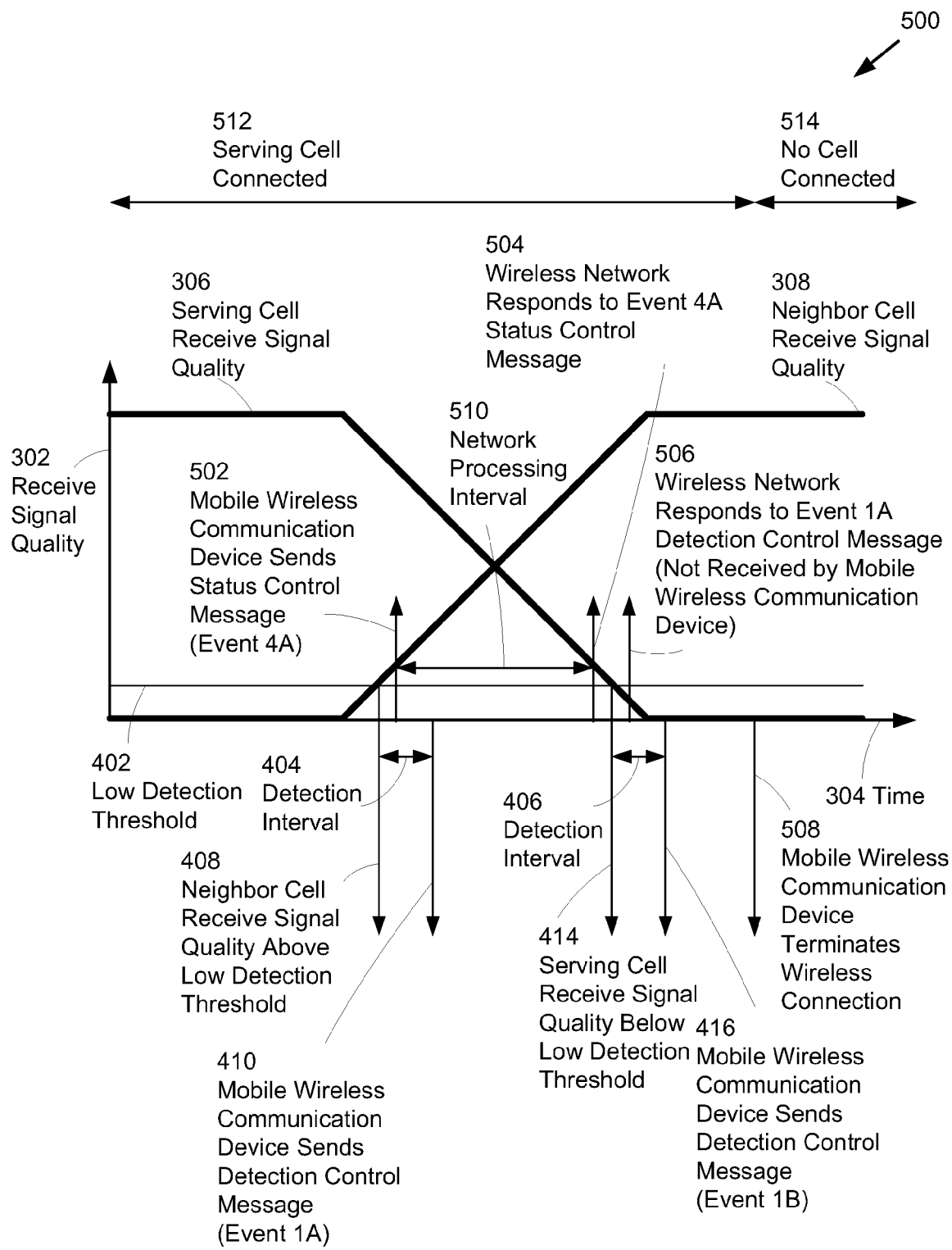
FIG. 5 illustrates an unsuccessful soft handoff between two cells and a terminated connection of a mobile wireless communication device in a wireless communication network.

FIG. 5 illustrates another series of events that can occur resulting in an unsuccessful soft handoff between the mobile wireless communication device 106 and the wireless communication network 100. As in FIG. 4, the mobile wireless communication device 106 can be connected at first to the serving cell. The receive signal quality 308 of the neighbor cell can exceed the low detection threshold 402, and the mobile wireless communication device 106, after waiting for the detection interval 404, can send a detection control message (event 410) to the wireless communication network 100 that includes the detected neighbor cell's receive signal quality. Unlike FIG. 4, the mobile wireless communication device 106 in FIG. 5 can send a status control message (event 502) to the wireless communication network 100 before sending the detection control message (event 410). A representative status control message can be an "event 4A" message, as used in a UMTS wireless communication network. The status control message from the mobile wireless communication device 106 can provide information to the wireless communication network 100 such as a transport channel traffic volume measurement. The wireless communication network 100 can respond to the control messages in the order received. Thus, the status control message can be processed by the wireless communication network 100 before the detection control message, resulting in a delayed response by the wireless communication network 100 to the detection control message.

The status control message can require a network processing time interval 510, after which the wireless communication network 100 can respond to the status control message (event 504). During the network processing time interval 510, the receive signal quality 302 from both the serving and neighbor cells can be changing rapidly. The serving cell receive quality 306 can be deteriorating, and the wireless communication network 100 can be unaware of this change in receive signal quality 306. As shown in FIG. 5, the wireless communication network 100 can learn of the degraded serving cell signal quality 306 when the mobile wireless communication device 106 sends the second detection control message (event 416) after detecting that the serving cell receive quality has fallen below the low detection threshold 402.

The wireless communication network 100 can respond to the first detection control message (event 506), but the mobile wireless communication device 106 can be unable to receive the wireless communication network's response because the receive signal quality 306 from the serving cell can be too low for the mobile wireless communication device 106 to detect the response. For example, the response can be below the detection threshold 402 as shown at the time of event 506. Because the mobile wireless communication device 106 cannot receive the wireless communication network's response to add the neighbor cell, a soft handoff cannot occur. After a period of time when the serving cell's receive signal quality 306 remains below the low detection threshold 402, the mobile wireless communication device 106 can terminate the wireless connection (event 508). The mobile wireless communication device 106 can thus be disconnected from the wireless communication network 100 during a time period 514, even though a neighbor cell's receive signal quality 308 can be sufficient to support at connection to the mobile wireless communication device 106.

Figure 6:
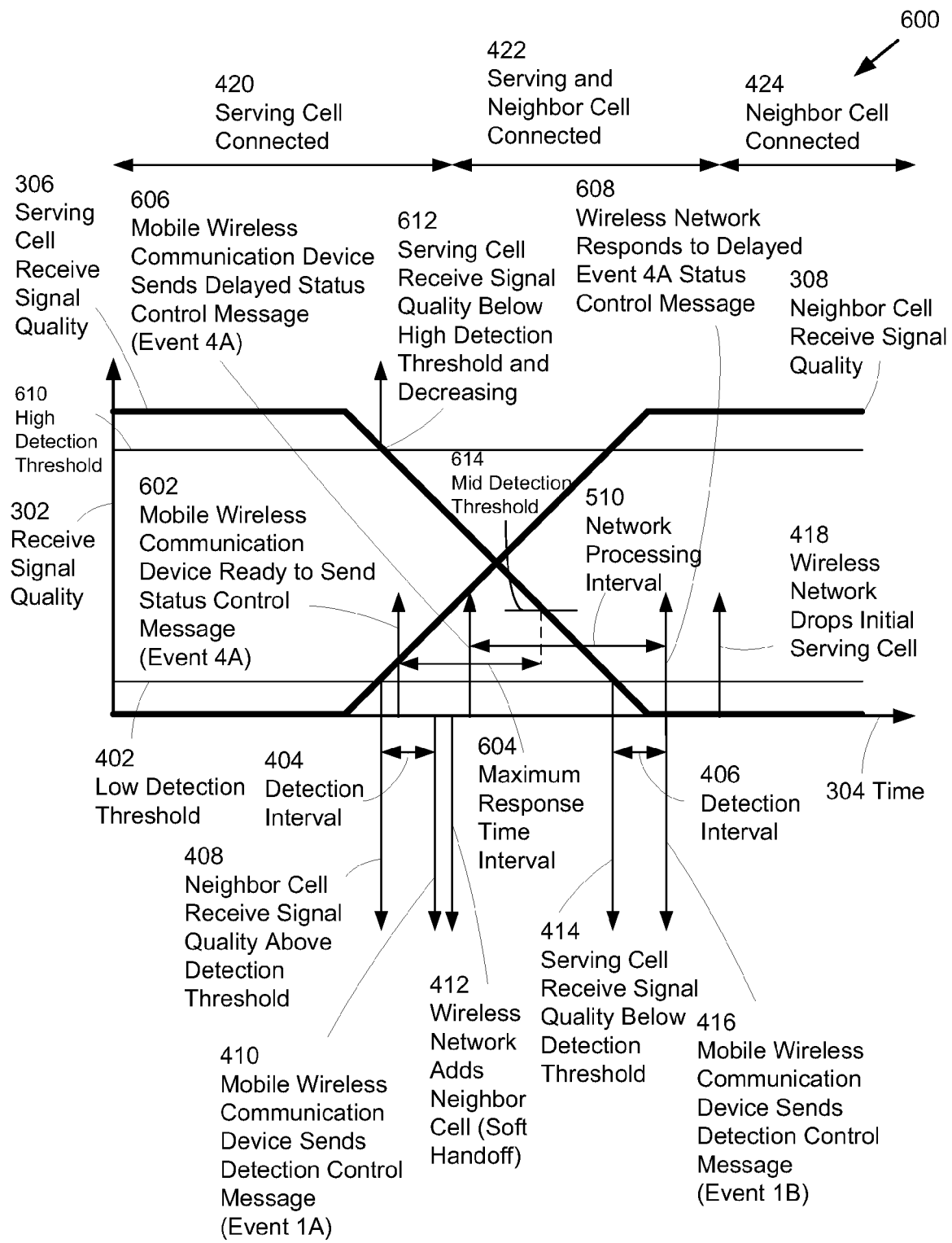
FIG. 6 illustrates a modified and successful version of the soft handoff of FIG. 5.

To realize a soft handoff between cells during a "crossing cell" scenario as described for FIG. 5, the mobile wireless communication device 106 can delay sending certain messages to the wireless communication network 100, as illustrated in FIG. 6. The mobile wireless communication device 106 can be ready to send a status control message (event 602), but rather than send the status control message immediately, the mobile wireless communication device 106 can first determine a maximum response time interval 604. The mobile wireless communication device 106 can delay sending a message, such as a status control message, to the wireless communication network 100 that would result in the wireless communication network 100 responding beyond the determined maximum response time interval 604. By delaying messages that can require longer times for response from the wireless communication network 100, the mobile wireless communication device 106 can effectively prioritize critical short response time messages. For example, the detection control message (event 410) that indicates the receive signal quality of the neighbor cell 308 can be sent before the status control message (delayed from 602 when ready the message is ready to a later time 606). The wireless communication network 100 can respond to the detection control message (event 410) by sending a message that adds the neighbor cell (event 412), which the mobile wireless communication device 106 can receive because the serving cell's receive signal quality 306 can still be above the low detection threshold 402.

The mobile wireless communication device 106 can estimate the maximum response time interval 604 by monitoring the serving cell receive signal quality 306. The monitoring can include detecting that the serving cell receive signal quality 306 falls below a high detection threshold 610 and is decreasing (event 612). By detecting the current value of the serving cell receive signal quality 306 and its rate of change, the mobile wireless communication device 106 can estimate over what maximum response time interval that messages sent by the serving cell can be successfully received by the mobile wireless communication device 106. Successful future receipt of messages can be assessed by comparing an estimated future value for the receive signal quality 306 of the serving cell against a "mid" detection threshold 614. The "mid" detection threshold 614 can be different from the "low" detection threshold 402. The estimation of "future" receive signal quality 306 can be particularly relevant when the mobile wireless communication device 106 is connected to only one cell in the wireless communication network 100. A rapid deterioration of the radio frequency link to the one cell can result in disconnecting the mobile wireless communication device 106 from the wireless communication network 100 before a radio frequency link can be established with a neighbor cell. Any messages that the mobile wireless communication device 106 can send to the wireless communication network 100 that can cause the wireless communication network 100 to respond beyond the maximum response time interval 604 can be delayed. The amount of delay applied to a message can vary depending on one or more characteristics such as an expected time for the wireless communication network 100 to respond to the message, a priority of the message and an estimate of future values of signal quality 306 received from the serving cell. The amount of delay can also be bounded by a settable maximum time value.

The delayed status control message can be sent after the added delay by the mobile wireless communication device 106 to the wireless communication network 100, and the wireless communication network 100 can respond to the delayed status control message (event 608). The mobile wireless communication device 106 can receive the response (event 608) even though the serving cell receive signal quality 306 falls below the low detection threshold 402, because the neighbor cell was successfully added by the soft handoff. The neighbor cell's receive signal quality 308 can be above the low detection threshold 402 when the response to the delayed status control message is received by the mobile wireless communication device 106. The mobile wireless communication device 106 can send a detection control message (event 416) indicating that the serving cell signal quality 306 falls below the low detection threshold 402, and the wireless communication network 100 can respond (event 418) by dropping the initial serving cell. The neighbor cell can thus become the new serving cell, and the wireless connection between the mobile wireless communication device 106 and the wireless communication network 100 can be sustained through a seamless transition between cells.

Figure 7:
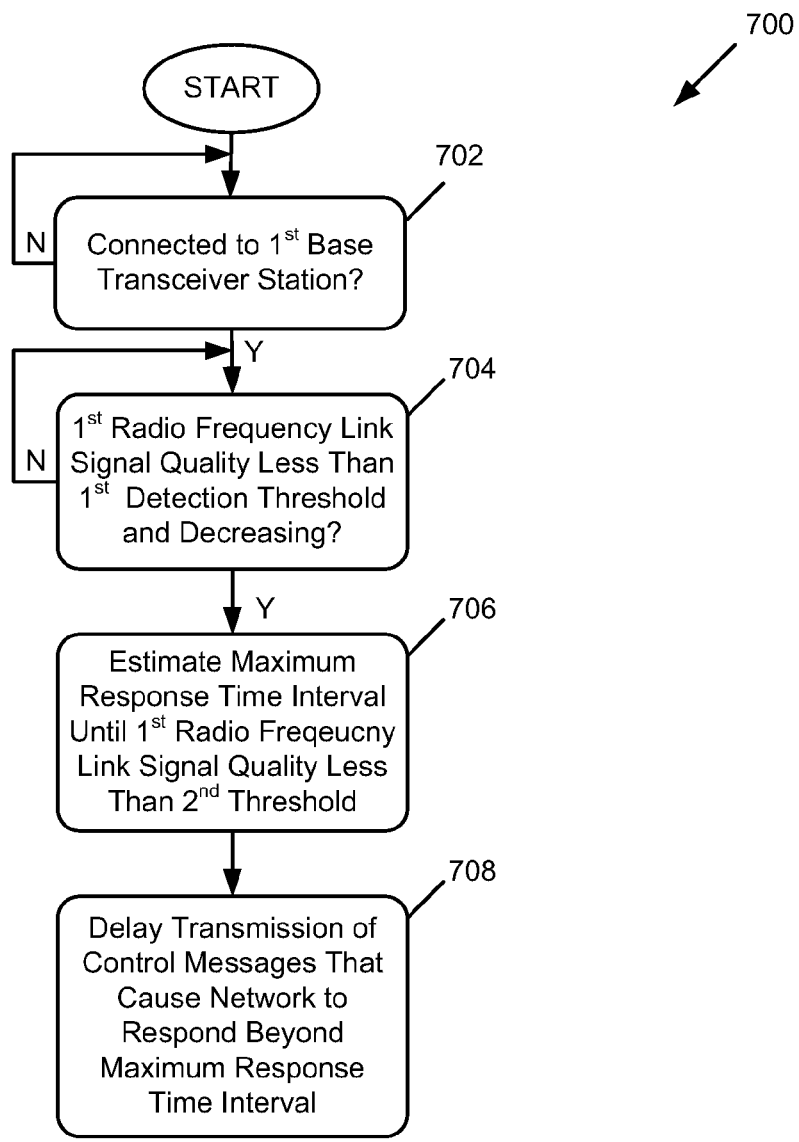
FIG. 7 illustrates a representative method to control a wireless connection between a mobile wireless communication device and a wireless communication network.

FIG. 7 illustrates a representative method 700 for controlling a wireless connection of the mobile wireless communication device 106 to a wireless communication network 100. The mobile wireless communication device 106 can first determine if it is connected by a first radio frequency link to a first base transceiver station of a serving cell (step 702). The mobile wireless communication device 106 can then determine if a signal quality of the first radio frequency link is less than a first detection threshold and decreasing in value (step 704). When the first radio frequency link has a deteriorating signal quality, the mobile wireless communication device 106 can possibly lose the connection to the wireless communication network 100 at a future time. In step 706, the mobile wireless communication device 106 can estimate a maximum response time interval until the first radio frequency link signal quality is less than a second threshold. The mobile wireless communication device 106 can estimate that messages sent from the wireless communication network 100 can be less likely to be received successfully by the mobile wireless communication device 106 after the maximum response time interval. As the wireless communication network 100 can respond to messages sent by the mobile wireless communication device 106 in the order received, in step 708 the mobile wireless communication device 106 can delay transmitting control messages that can cause the wireless communication network 100 to respond beyond the maximum response time interval. Thus messages to which the wireless communication network 100 can respond more rapidly can be sent before messages that cause the wireless communication network 100 to respond more slowly. Critical messages, such as detection control messages that indicate neighbor cell signal quality, can be processed by the network before less critical messages, such as status message, and a soft handoff between the serving cell and the neighbor cell can be successfully realized.

Various aspects of the described embodiments can be implemented by software, hardware or a combination of hardware and software. The described embodiments can also be embodied as computer program code on a computer readable medium for controlling a wireless connection in a mobile wireless communication device. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of controlling a wireless connection of a mobile wireless communication device to a wireless communication network, the method comprising: when the wireless mobile communication device is connected to a first base transceiver station through a first radio frequency link; detecting a signal quality of the first radio frequency link, wherein the detected signal quality is at or below a first threshold and decreasing over a first detection time interval; estimating a maximum response time interval until the detected signal quality of the first radio frequency link is below a second threshold; and delaying transmission of only control messages from the mobile wireless communication device for a delay interval that cause the wireless communication network to respond to subsequent control messages beyond the estimated maximum response time interval.

2. The method as recited in claim 1, wherein the signal quality of the first radio frequency link is at least one of a measure of signal power received from the first base transceiver station and a measure of received signal power from the first base transceiver station relative to received noise.

3. The method as recited in claim 1, wherein the delayed control messages from the mobile wireless communication device include a status protocol data unit.

4. The method as recited in claim 1, wherein the delayed control messages from the mobile wireless communication device include a traffic volume measurement.

5. The method as recited in claim 1 further comprising:
transmitting a detection control message before transmitting the delayed control messages from the mobile wireless communication device to the wireless communication network;
wherein the detection control message indicates receiving a signal at the mobile wireless communication device from a second base transceiver station having a second signal quality above a third threshold and increasing for a second detection interval.

6. The method as recited in claim 5, wherein the second signal quality is at least one of a measure of signal power received from the second base transceiver station and a measure of received signal power from the second base transceiver station relative to received noise.

7. The method as recited in claim 5 further comprising:
receiving a control message at the mobile wireless communication device from the wireless communication network establishing a second radio frequency link between the mobile wireless communication device and the second base transceiver station before transmitting the delayed control messages from the mobile wireless communication device to the wireless communication network.

8. The method as recited in claim 7 further comprising:
sending a control message from the mobile wireless communication device to the wireless communication network indicating radio frequency link failure of the first radio frequency link with the first base transceiver station after establishing the second radio frequency link with the second base transceiver station.

9. A mobile wireless communication device, comprising: a first transceiver that receives signals through a wireless connection from a wireless communication network; a control processor coupled to the first transceiver, wherein the control processor controls the wireless connection to the wireless communication network by: when the wireless mobile communication device is connected to a first base transceiver station through a first radio frequency link; detecting a signal quality of the first radio frequency link, wherein the detected signal quality is at or below a first threshold and decreasing over a first detection time interval; estimating a maximum response time interval until the detected signal quality of the first radio frequency link is below a second threshold; and delaying transmission of only control messages from the mobile wireless communication device for a delay interval that cause the wireless communication network to respond to subsequent control messages beyond the estimated maximum response time interval.

10. The mobile wireless communication device as recited in claim 9, wherein the signal quality of the first radio frequency link is at least one of a measure of signal power received from the first base transceiver station and a measure of received signal power from the first base transceiver station relative to received noise.

11. The mobile wireless communication device as recited in claim 9, wherein the delayed control messages from the mobile wireless communication device include a status protocol data unit.

12. The mobile wireless communication device as recited in claim 9, wherein the delayed control messages from the mobile wireless communication device include a traffic volume measurement.

13. The mobile wireless communication device as recited in claim 9, wherein the control processor further controls the wireless connection to the wireless communication network by:
transmitting a detection control message before transmitting the delayed control messages from the mobile wireless communication device to the wireless communication network;
wherein the detection control message indicates receiving a signal at the mobile wireless communication device from a second base transceiver station having a second signal quality above a third threshold and increasing for a second detection interval.

14. The mobile wireless communication device as recited in claim 13, wherein the second signal quality is at least one of a measure of signal power received from the second base transceiver station and a measure of received signal power from the second base transceiver station relative to received noise.

15. The mobile wireless communication device as recited in claim 14, wherein the control processor further controls the wireless connection to the wireless communication network by:
receiving a control message at the mobile wireless communication device from the wireless communication network establishing a second radio frequency link between the mobile wireless communication device and the second base transceiver station before transmitting the delayed control messages from the mobile wireless communication device to the wireless communication network.

16. The method as recited in claim 15, wherein the control processor further controls the wireless connection to the wireless communication network by:
sending a control message from the mobile wireless communication device to the wireless communication network indicating radio frequency link failure of the first radio frequency link with the first base transceiver station after establishing the second radio frequency link with the second base transceiver station.

17. A non-transitory computer readable medium for tangibly storing computer program code executable by a processor for controlling a wireless connection in a mobile wireless communication device comprising: when the wireless mobile communication device is connected to a first base transceiver station through a first radio frequency link;
computer program code for detecting a signal quality of the first radio frequency link, wherein the detected signal quality is at or below a first threshold and decreasing over a first detection time interval;
computer program code for estimating a maximum response time interval until the detected signal quality of the first radio frequency link is below a second threshold; and computer program code for delaying transmission of only control messages from the mobile wireless communication device for a delay interval that cause the wireless communication network to respond to subsequent control messages beyond the estimated maximum response time interval.

18. The non-transitory computer readable medium as recited in claim 17, wherein the signal quality of the first radio frequency link is at least one of a measure of signal power received from the first base transceiver station and a measure of received signal power from the first base transceiver station relative to received noise.

19. The non-transitory computer readable medium as recited in claim 17, wherein the delayed control messages from the mobile wireless communication device include a status protocol data unit.

20. The non-transitory computer readable medium as recited in claim 17, wherein the delayed control messages from the mobile wireless communication device include a traffic volume measurement.

21. The non-transitory computer readable medium as recited in claim 17 further comprising: computer program code for transmitting a detection control message before transmitting the delayed control messages from the mobile wireless communication device to the wireless communication network;
wherein the detection control message indicates receiving a signal at the mobile wireless communication device from a second base transceiver station having a second signal quality above a third threshold and increasing for a second detection interval.

22. The non-transitory computer readable medium as recited in claim 21, wherein the second signal quality is at least one of a measure of signal power received from the second base transceiver station and a measure of received signal power from the second base transceiver station relative to received noise.

23. The non-transitory computer readable medium as recited in claim 21 further comprising: computer program code for receiving a control message at the mobile wireless communication device from the wireless communication network establishing a second radio frequency link between the mobile wireless communication device and the second base transceiver station before transmitting the delayed control messages from the mobile wireless communication device to the wireless communication network.

24. The non-transitory computer readable medium as recited in claim 23 further comprising: computer program code for sending a control message from the mobile wireless communication device to the wireless communication network indicating radio frequency link failure of the first radio frequency link with the first base transceiver station after establishing the second radio frequency link with the second base transceiver station.

* * * * *